United States Patent
Lin et al.

(10) Patent No.: US 11,883,859 B2
(45) Date of Patent: Jan. 30, 2024

(54) LASER CLEANING METHOD AND DEVICE FOR IMPROVING UNIFORMITY OF LASER CLEANING SURFACE

(71) Applicants: INSTITUTE OF SEMICONDUCTORS, CHINESE ACADEMY OF SCIENCES, Beijing (CN); CHANGSHA AERONAUTICAL VOCATIONAL AND TECHNICAL COLLEGE, Changsha (CN)

(72) Inventors: Xuechun Lin, Beijing (CN); Zhiyan Zhang, Beijing (CN); Haijun Yu, Beijing (CN); Houwang Zhu, Changsha (CN); Quansheng Zeng, Changsha (CN); Zhiyong Dong, Beijing (CN); Hao Liang, Beijing (CN); Wenhao Ma, Beijing (CN); Hongyang Wang, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 338 days.

(21) Appl. No.: 17/130,486

(22) Filed: Dec. 22, 2020

(65) Prior Publication Data
US 2021/0187565 A1 Jun. 24, 2021

(30) Foreign Application Priority Data

Dec. 24, 2019 (CN) .......................... 201911353814.2

(51) Int. Cl.
*B23K 26/082* (2014.01)
*B08B 7/00* (2006.01)
(Continued)

(52) U.S. Cl.
CPC ............ *B08B 7/0042* (2013.01); *B23K 26/06* (2013.01); *B23K 26/073* (2013.01); *B23K 26/082* (2015.10)

(58) Field of Classification Search
CPC .... B08B 7/0042; B23K 26/06; B23K 26/073; B23K 26/082; B23K 26/064; B23K 26/0738
(Continued)

(56) References Cited

U.S. PATENT DOCUMENTS 5,214,531 A * 5/1993 Torii ..................... B23K 9/1274
250/236
5,870,490 A * 2/1999 Takahashi .............. G06V 20/64
356/613
(Continued)

FOREIGN PATENT DOCUMENTS

CN 104620129 U 5/2015
CN 207271722 U 4/2018
(Continued)

OTHER PUBLICATIONS

First Chinese Office Action dated Jul. 7, 2020 for Chinese patent application No. 201911353814.2, 17 pages including English translation.

*Primary Examiner* — Vu A Vu
(74) *Attorney, Agent, or Firm* — Christopher R: Christenson; Kelly, Holt & Christenson, PLLC (57) ABSTRACT

A laser cleaning method and device for improving uniformity of a laser cleaning surface are provided. The laser cleaning method includes: applying a peaked-top sine wave signal to a motor; controlling a galvanometer to swing in a reciprocated manner by the motor; shaping a laser beam
(Continued)

emitted by a laser to a linear beam by the reciprocated swing of the galvanometer; and performing laser cleaning using the shaped linear beam.

4 Claims, 5 Drawing Sheets

(51) Int. Cl.
*B23K 26/073* (2006.01)
*B23K 26/06* (2014.01)
(58) Field of Classification Search
USPC ...................................................... 372/29.01
See application file for complete search history.

(56) References Cited

U.S. PATENT DOCUMENTS

| | | | | |
|---|---|---|---|---|
| 7,701,610 | B2* | 4/2010 | Mikami | ............. G03G 15/0856 |
| | | | | 358/1.9 |
| 9,651,774 | B2* | 5/2017 | Fujiwara | ............ G02B 23/2469 |
| 10,300,559 | B2* | 5/2019 | Yoshida | ............... B23K 26/082 |
| 10,326,250 | B2* | 6/2019 | Lu | ............................ H01S 3/137 |
| 10,788,662 | B2* | 9/2020 | Chiang | .................. G02B 27/30 |
| 2008/0001569 | A1* | 1/2008 | Ito | .............................. H02P 7/29 |
| | | | | 318/638 |
| 2018/0136458 | A1* | 5/2018 | Plucinski | ............... B33Y 30/00 |

FOREIGN PATENT DOCUMENTS

| | | |
|---|---|---|
| CN | 109991611 A | 7/2019 |
| CN | 110280536 A | 9/2019 |
| CN | 209550142 U | 10/2019 |
| CN | 110524109 A | 12/2019 |
| JP | 2004063692 A | 2/2004 |
| JP | 2006337922 A | 12/2006 |
| JP | 2010066702 A | 3/2010 |

\* cited by examiner

LASER CLEANING METHOD AND DEVICE FOR IMPROVING UNIFORMITY OF LASER CLEANING SURFACE

CROSS-REFERENCE TO RELATED APPLICATION

This application claims the benefit of Chinese Patent Application No. 201911353814.2 filed on Dec. 24, 2019, the whole disclosure of which is incorporated herein by reference.

TECHNICAL FIELD

The present disclosure relates to the field of laser processing, in particular, to a laser cleaning method and device for improving uniformity of a laser cleaning surface.

BACKGROUND

In existing high-power solid laser devices, light emitted by the laser is guided to a processing head through an optical fiber, and the processing head is partly equipped with a galvanometer, which shapes the laser beam into a linear light spot in the manner of reciprocated swing. In the practical industrial application, in order to improve cleaning speed and accuracy, processing manufacturers often combine the processing head with a robot, and the robot drives the processing head to move to achieve cleaning in a certain area. Therefore, the output laser actually sweeps across the target area in a zigzag route.

The swing of the galvanometer is mainly controlled by applying a periodical signal to the motor. The existing control signals are mainly triangular waves and sine waves, both of which may cause some problems in the actual cleaning process. The galvanometer may swing at a constant speed by loading a triangular wave on the motor. Therefore, within a cleaning line, the spot distribution is uniform. However, in the zigzag route, the cleaning coverage ratio in the middle area is high, while the cleaning coverage ratio in both side areas is low. A sine wave may be applied on the motor to cause the swing speed of the galvanometer to gradually increase from zero and then gradually decrease to zero within a linear shape. Therefore, in a cleaning line, the light spots are densely distributed on both sides and sparsely distributed in the middle area. In this way, the problem caused by the "zigzag" cleaning may be corrected to some extent, but an overablation phenomenon may occur due to the dense distribution of the spots on both sides. A feasible solution is urgently needed at present.

SUMMARY

In an aspect, a laser cleaning method for improving uniformity of a laser cleaning surface is provided, comprising: applying a peaked-top sine wave signal to a motor; controlling a galvanometer to swing in a reciprocated manner by the motor; shaping a laser beam emitted by a laser to a linear beam by the reciprocated swing of the galvanometer; and performing laser cleaning using the shaped linear beam.

According to some exemplary embodiments, performing laser cleaning using the shaped linear beam further comprises: controlling a path of laser cleaning by a manipulating device, wherein the path of laser cleaning moves periodically; and implementing laser cleaning by combining multiple cleaning periods and the swing of the galvanometer.

According to some exemplary embodiments, the laser cleaning method further comprises generating the peaked-top sine wave signal, wherein generating the peaked-top sine wave signal comprises: generating a flat-top sine signal from a sine wave signal by a first amplitude limiting circuit; generating a flat-top triangular wave signal from a triangular wave signal by a second amplitude limiting circuit; generating a special triangular wave signal from the triangular wave signal and the flat-top triangular wave signal by a subtraction circuit; and generating the peaked-top sine wave signal from the flat-top sine signal and the special triangular wave signal by an addition circuit, wherein the sine wave signal and the triangular wave signal have the same period.

In another aspect, a laser cleaning device for improving uniformity of a laser cleaning surface is provided, wherein the laser cleaning device comprises: a laser configured to emit a laser beam; a galvanometer configured to shape the laser beam linearly by swing; and a motor configured to receive a periodical signal and control reciprocated swing of the galvanometer based on the periodical signal, wherein the periodical signal is a peaked-top sine wave signal.

According to some exemplary embodiments, the laser cleaning device further comprises: a signal generation module configured to generate the peaked-top sine wave signal and transmit the peaked-top sine wave signal to the motor.

According to some exemplary embodiments, the signal generation module comprises: a first signal generator configured to generate a sine wave signal; a second signal generator configured to generate a triangular wave signal; a signal converting circuit configured to combine and convert the sine wave signal and the triangular wave signal to obtain the peaked-top sine wave signal.

According to some exemplary embodiments, the signal converting circuit comprises: a first amplitude limiting circuit configured to receive the sine wave signal to generate a flat-top sine signal; a second amplitude limiting circuit configured to receive the triangular wave signal to generate a flat-top triangular wave signal; a subtraction circuit configured to receive the triangular wave signal and the flat-top triangular wave signal to generate a special triangular wave signal; and an addition circuit configured to receive the flat-top sine signal and the special triangular wave signal to generate the peaked-top sine wave signal.

According to some exemplary embodiments, the laser cleaning device further comprises: a processing head on which the galvanometer is mounted.

According to some exemplary embodiments, the laser cleaning device further comprises: an optical fiber configured to guide the laser beam emitted by the laser to the processing head.

According to some exemplary embodiments, the processing head is arranged on a manipulating device.

DETAILED DESCRIPTION OF EMBODIMENTS

In order to make the purpose, technical solutions and advantages of the present disclosure clearer, the present disclosure will be further described in detail in combination with embodiments and with reference to the drawings.

The present disclosure discloses a laser cleaning method and device for improving uniformity of a laser cleaning surface. Based thereon, the present disclosure also discloses an implementing method for peaked-top sine waves, which are used to control the motor of the processing head of the laser cleaning device to implement laser cleaning based on the laser cleaning device.

The peaked-top sine wave may be implemented in the following method. Firstly, a sine wave signal passes through an amplitude limiting circuit to generate a flat-top sine signal, and a triangular signal also passes through an amplitude limiting circuit to generate a flat-top triangular wave signal, and then the triangular wave signal and the generated flat-top triangular wave signal pass through a subtraction circuit to generate a special triangular wave signal, and finally the generated flat-top sine signal and the special triangular wave signal pass through an addition circuit to generate a required peaked-top sine wave signal.

The laser cleaning method and device as well as how to implement the peaked-top sine wave of the present disclosure will be described in detail as follows by means of specific embodiments.

In an embodiment, a laser cleaning device is provided including: a laser configured to emit a laser beam; a galvanometer configured to shape the laser beam linearly by swing; a motor configured to receive a periodical signal and control reciprocated swing of the galvanometer based on the periodical signal, wherein the periodical signal is a peaked-top sine wave signal.

In some embodiments, the device further includes a signal generation module configured to generate the peaked-top sine wave signal and transmit the peaked-top sine wave signal to the motor.

In the laser cleaning device, the beam emitted by the laser is shaped into a light spot by the galvanometer swing, and then laser cleaning is implemented through the light spot. The swing of the galvanometer is controlled by applying a periodic signal to the motor. In the embodiment, the periodic signal is a peaked-top sine wave signal formed by combining advantages of the sine wave signal and the triangular wave signal. Specifically, by means of the peaked-top sine wave signal, the problem of low cleaning coverage ratio in the both side areas in the laser cleaning process formed by the triangular wave signal may be solved, and dense light spot distribution on both sides in the laser cleaning process caused by the sine wave signal may also be solved, so that the overablation phenomenon may be effectively prevented. Furthermore, in combination with multiple cleaning periods, the peaked-top sine wave signal may make the entire area receive relatively uniform laser energy to some extent, achieving more uniform laser cleaning.

In some embodiments, the signal generation module includes: a first signal generator configured to generate a sine wave signal; a second signal generator configured to generate a triangular wave signal; and a signal converting circuit configured to combine and convert the sine wave signal and the triangular wave signal to obtain the required peaked-top sine wave signal.

It should be noted that the first signal generator and the second signal generator may also be a signal generator configured to generate selectively signals with different waveforms, for example, the generable signals include but are not limited to the sine wave signal and the triangular wave signal, or may also include signals such as a sawtooth wave, a rectangular wave. A specific waveform signal is further selected according to the cleaning effect to be actually achieved. In the embodiment, preferably, the laser cleaning device includes two signal generators. Furthermore, the two signal generators generate sine wave signals and triangular wave signals simultaneously, and finally the required peaked-top sine wave signal is obtained by the signal converting circuit.

It should be further noted that the signal generator may be selected as a sine signal generator, function (waveform) signal generator, pulse signal generator and/or random-signal generator, as long as achieving the corresponding technical effect.

In some embodiments, the signal converting circuit further includes: a first amplitude limiting circuit configured to receive the sine wave signal to generate a flat-top sine signal; a second amplitude limiting circuit configured to receive the triangular wave signal to generate a flat-top triangular wave signal; a subtraction circuit configured to receive the triangular wave signal and the flat-top triangular wave signal to generate a special triangular wave signal; and an addition circuit configured to receive the flat-top sine signal and the special triangular wave signal to generate the peaked-top sine wave signal.

It should be noted that the first amplitude limiting circuit and the second amplitude limiting circuit have the same structure but different limiting ranges. Further, the limiting range of the amplitude limiting circuit is obtained through experiment based on actual effects or theoretical calculation and testing, as long as achieving more uniform laser energy distribution.

In some embodiments, the device further includes a processing head on which the galvanometer is mounted; and/or an optical fiber configured to guide the laser beam emitted by the laser to the processing head.

In the embodiment, the galvanometer is mounted on the processing head, and the optical fiber is arranged between the processing head and the laser to reduce the loss of the laser beam during the transmission. Alternatively, both the motor and the galvanometer may be arranged on the processing head, or, the motor is arranged outside the laser cleaning device as long as corresponding energy is provided for the galvanometer.

In some embodiments, the processing head is further arranged on a manipulating device.

In the embodiment, the manipulating device is, for example, a robot, configured to drive the processing head to move to achieve cleaning in relevant area.

An embodiment, based on the laser cleaning device of the above embodiments, provides a laser cleaning method, including: applying a peaked-top sine wave signal to a motor; controlling a galvanometer to swing in a reciprocated manner by the motor; shaping a laser beam emitted by a laser to a linear beam by the reciprocated swing of the galvanometer; and performing laser cleaning using the shaped linear beam.

Further, the step of performing laser cleaning using the shaped linear beam further includes: controlling a path of laser cleaning by a manipulating device, wherein the path of laser cleaning moves periodically; and implementing laser cleaning by combining multiple cleaning periods and the swing of the galvanometer.

Figure 1:
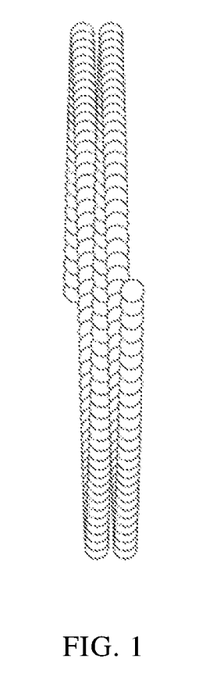
FIG. 1 is a schematic diagram illustrating light spot distribution formed by a pulse laser cleaning method according to an embodiment of the present disclosure.

In the embodiment, the light spot distribution formed based on the cleaning method is shown in FIG. 1.

Figure 2:
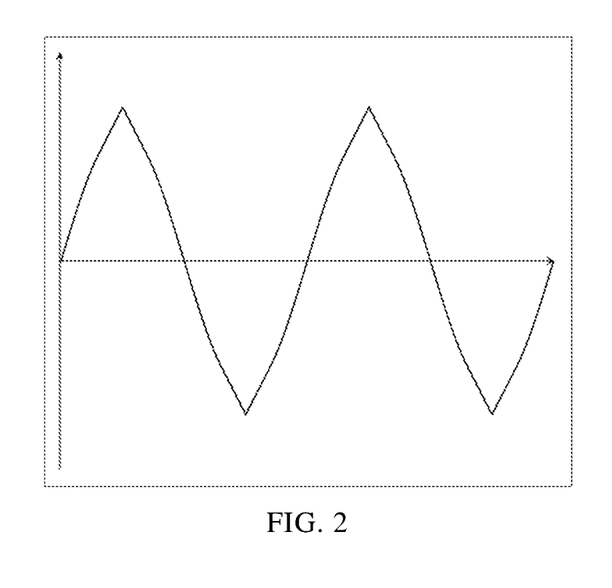
FIG. 2 is a schematic diagram illustrating a peaked-top sine wave according to an embodiment of the present disclosure.

It should be noted that a main control manner of the laser cleaning method is to load a peaked-top sine wave on the motor of the processing head of the laser cleaning device, as shown in FIG. 2.

Based on the laser cleaning device and method according to the above embodiments, an embodiment provides an implementing method for a peaked-top sine wave as shown in FIG. 2, to help the laser cleaning device to complete the laser cleaning.

The method may include the following steps: generating a flat-top sine signal from a sine wave signal by a first amplitude limiting circuit; generating a flat-top triangular wave signal from a triangular wave signal by a second amplitude limiting circuit; generating a special triangular wave signal from the triangular wave signal and the flat-top triangular wave signal by a subtraction circuit; and generating the peaked-top sine wave signal from the flat-top sine signal and the special triangular wave signal by an addition circuit.

Specifically, in the embodiment, the method may be implemented as follows.

Figure 3:
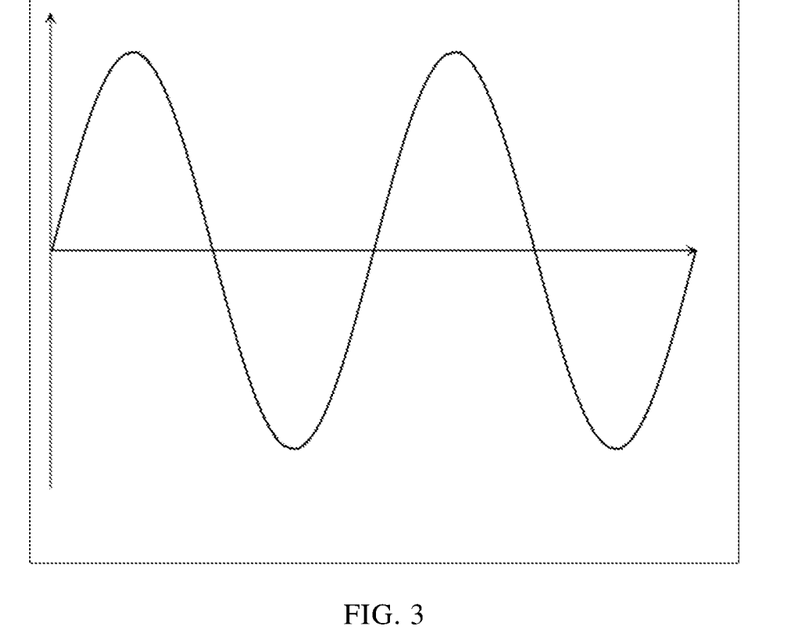
FIG. 3 is a schematic diagram illustrating a sine wave according to an embodiment of the present disclosure.
Figure 4:
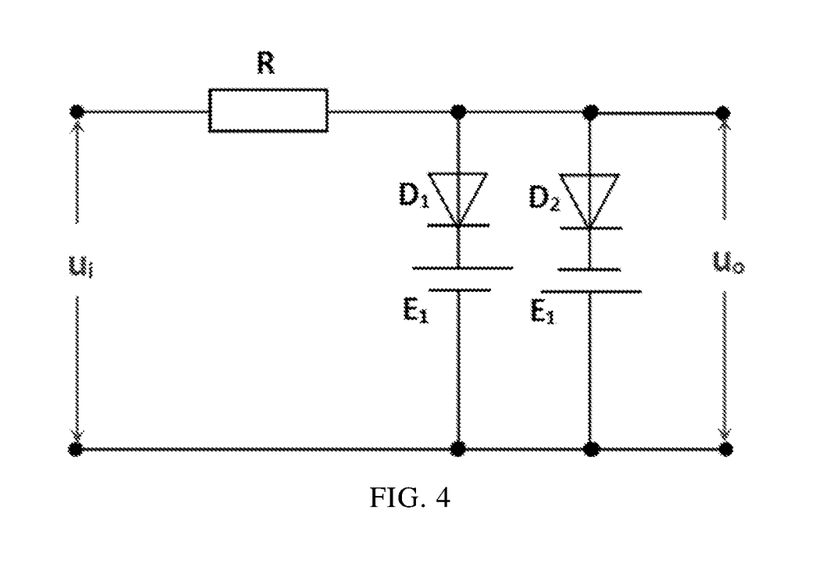
FIG. 4 is a schematic diagram illustrating an amplitude limiting circuit according to an embodiment of the present disclosure.
Figure 5:
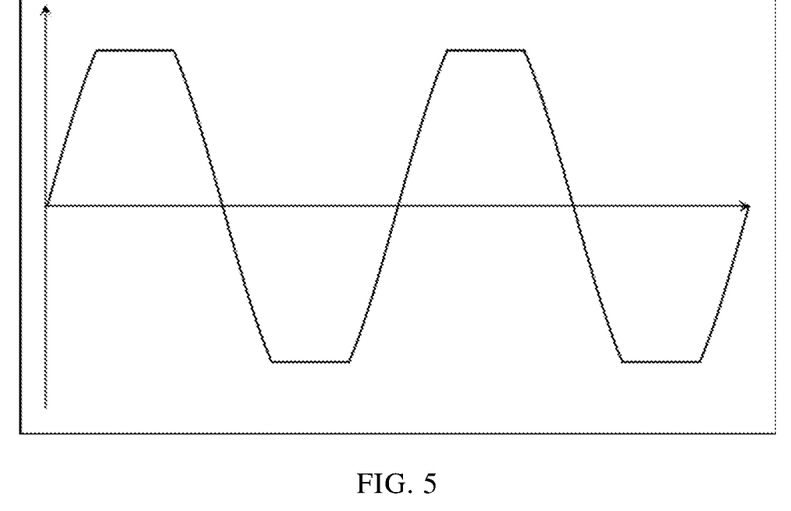
FIG. 5 is a schematic diagram illustrating a flat-top sine wave according to an embodiment of the present disclosure.
Figure 6:
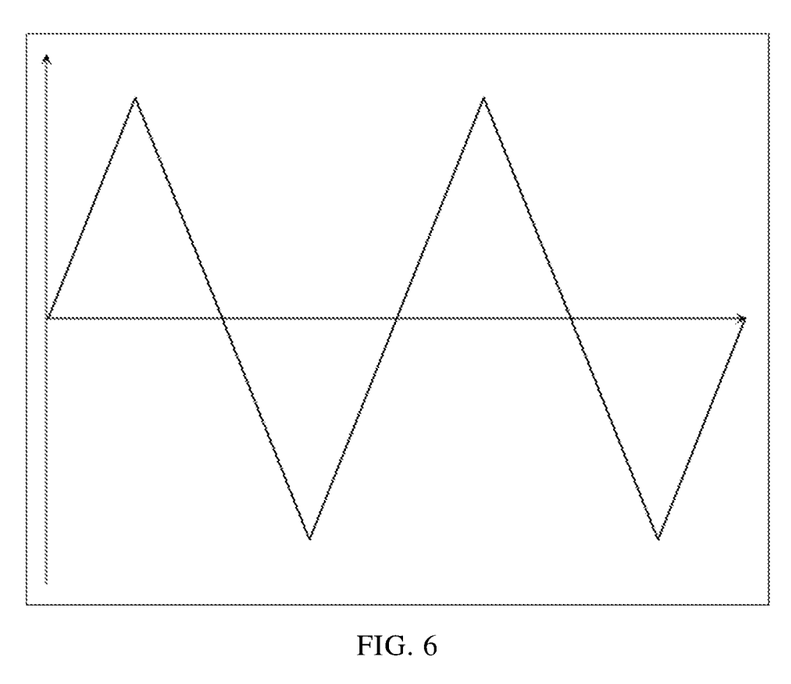
FIG. 6 is a schematic diagram illustrating a triangular wave according to an embodiment of the present disclosure.
Figure 7:
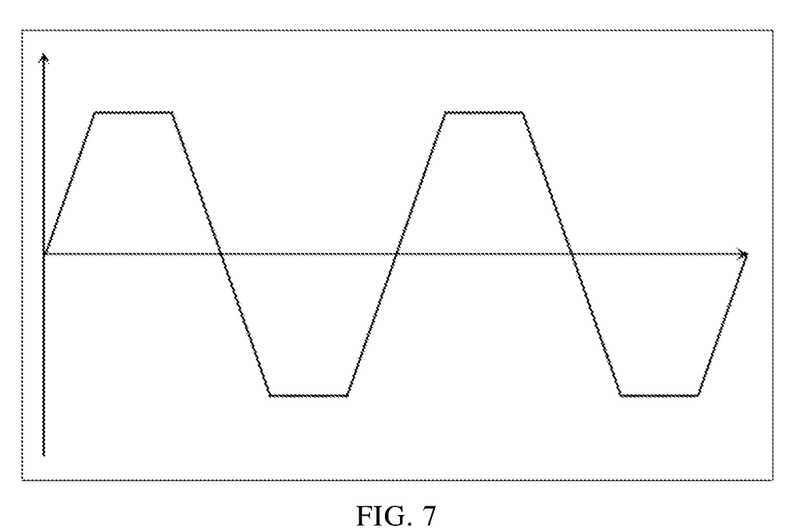
FIG. 7 is a schematic diagram illustrating a flat-top triangular wave according to an embodiment of the present disclosure.
Figure 8:
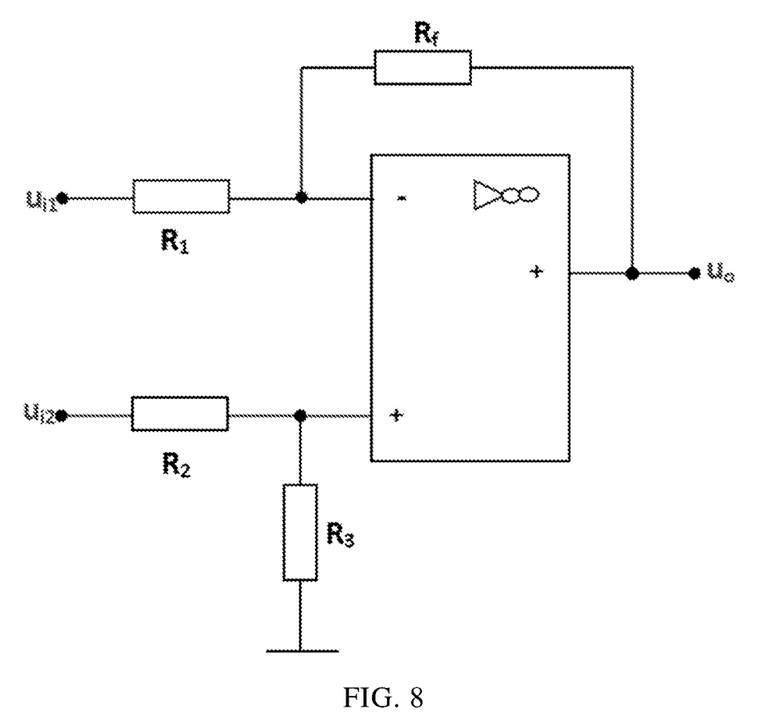
FIG. 8 is a schematic diagram illustrating a subtraction circuit according to an embodiment of the present disclosure.
Figure 9:
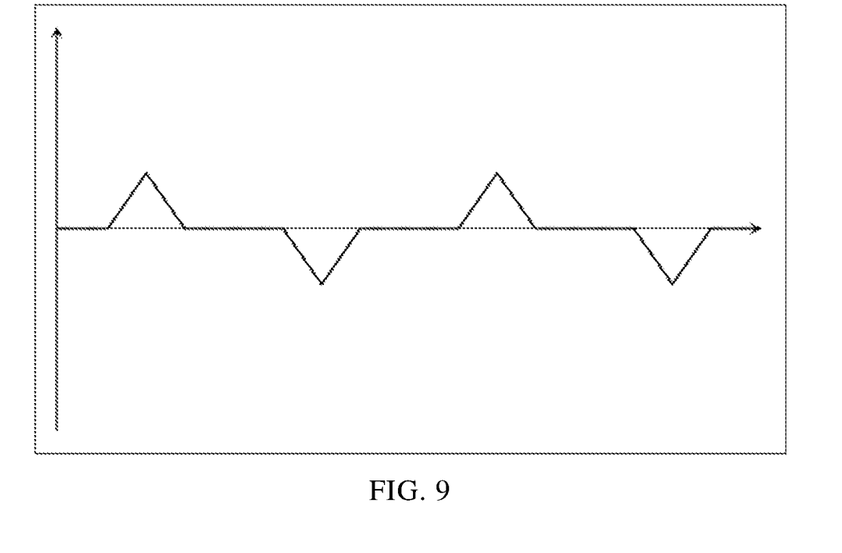
FIG. 9 is a schematic diagram illustrating a special triangular wave according to an embodiment of the present disclosure.
Figure 10:
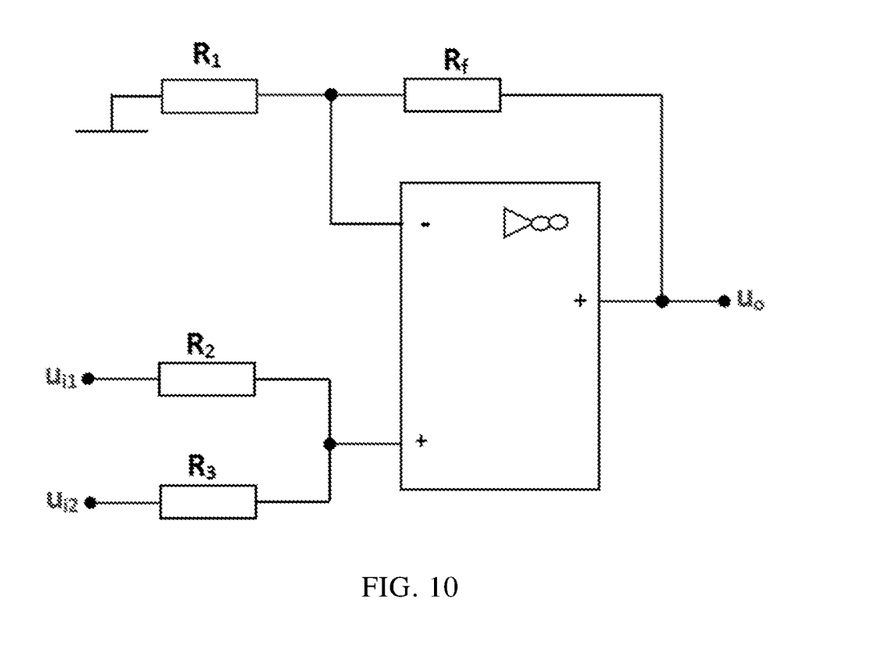
FIG. 10 is a schematic diagram illustrating an addition circuit according to an embodiment of the present disclosure.

The sine wave as shown in FIG. 3 may pass through an amplitude limiting circuit, as shown in FIG. 4, to generate a flat-top sine wave as shown in FIG. 5; the triangular wave, as shown in FIG. 6, with the same period as that of the above sine wave, may pass through another amplitude limiting circuit to generate a flat-top triangular wave as shown in FIG. 7; the above triangular wave signal and the flat-top triangular wave signal may pass through a subtraction circuit to generate a special triangular wave signal as shown in FIG. 9; the above flat-top sine wave signal and the special triangular wave signal may pass through an addition circuit, as shown in FIG. 10, to generate a required peaked-top sine wave (FIG. 2).

So far, the peaked-top sine wave required by the laser cleaning device and method is implemented, and the laser cleaning is implemented based thereon.

Embodiments of the present disclosure disclose a laser cleaning method and device for improving uniformity of a laser cleaning surface. The advantageous effect thereof may be described as follows.

In a complete cleaning line, the light spot generated by the cleaning method distributes sparsely in the middle area and densely on both side areas, and the motor has very high acceleration when the motor is reciprocating and scanning by changing its angle. Therefore, both ends of the linear beam will not be over-cleaned due to over-long residence time. Combined with multiple cleaning periods (one cleaning period is to sweep two complete lines back and forth), in the method, the entire area may receive uniform laser energy in general. Therefore, the cleaning method may improve the cleaning quality.

The above embodiments describe the purpose, technical solutions and advantageous effects of the present disclosure in detail. It should be understood that the above embodiments are only embodiments of the present disclosure and are not intended to limit the present disclosure. Any modification, equivalent replacement, improvement, and the like within the principle of the present disclosure shall be included in the protection scope thereof.

What is claimed is:

1. A laser cleaning device for improving uniformity of a laser cleaning surface, wherein the laser cleaning device comprises:

a laser configured to emit a laser beam;

a galvanometer configured to shape the laser beam linearly by swing; and a motor configured to receive a periodical signal and control reciprocated swing of the galvanometer based on the periodical signal, wherein the periodical signal is a peaked-top sine wave signal, and the laser beam shaped by the galvanometer is used for laser cleaning;

wherein the laser cleaning device further comprises a signal generation module configured to generate the peaked-top sine wave signal and transmit the peaked-top sine wave signal to the motor;

wherein the signal generation module comprises: a first signal generator configured to generate a sine wave signal; a second signal generator configured to generate a triangular wave signal; and a signal converting circuit configured to combine and convert the sine wave signal and the triangular wave signal to obtain the peaked-top sine wave signal;

wherein the signal converting circuit comprises:

a first amplitude limiting circuit configured to receive the sine wave signal to generate a flat-top sine signal;

a second amplitude limiting circuit configured to receive the triangular wave signal to generate a flat-top triangular wave signal;

a subtraction circuit configured to subtract the flat-top triangular wave signal from the triangular wave signal to obtain a special triangular wave signal, such that the special triangular wave signal has a same period as the triangular wave signal and in the period of the special triangular wave, the special triangular wave comprises a first part, a second part, a third part, a fourth part and a fifth part which are connected in sequence, wherein each of the first part, the third part, and the fifth part is at zero voltage, the second part is a positive triangular pulse, and the fourth part is a negative triangular pulse spaced apart from the first part by the third part; and an addition circuit configured to add the flat-top sine signal with the special triangular wave signal to obtain the peaked-top sine wave signal, such that in a period of the peaked-top sine wave signal, the peaked-top sine wave signal has first top portion in form of a positive triangular wave and a second top portion in form of a negative triangular wave.

2. The laser cleaning device according to claim 1, further comprising: a processing head on which the galvanometer is mounted.

3. The laser cleaning device according to claim 2, further comprising:

an optical liber configured to guide the laser beam emitted by the laser to the processing head.

4. The laser cleaning device according to claim 3, wherein the processing head is arranged on a manipulating device.

* * * * *